United States Patent
Kojima et al.

(10) Patent No.: US 7,872,801 B2
(45) Date of Patent: Jan. 18, 2011

(54) FRESNEL LENS SHEET, LIGHT-TRANSMISSION SCREEN, AND PROJECTION IMAGE DISPLAY APPARATUS

(75) Inventors: Kuniko Kojima, Tokyo (JP); Hayato Takeuchi, Tokyo (JP); Norihiro Watanabe, Tokyo (JP); Yuzo Nakano, Tokyo (JP); Takao Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 184 days.

(21) Appl. No.: 12/289,282

(22) Filed: Oct. 23, 2008

(65) Prior Publication Data

US 2009/0135480 A1     May 28, 2009

(30) Foreign Application Priority Data

Oct. 24, 2007 (JP) .............................. 2007-276199

(51) Int. Cl.
*G03B 21/60* (2006.01)
(52) U.S. Cl. .................... 359/457; 359/460; 359/742
(58) Field of Classification Search ................. 359/443, 359/457, 460, 742–743
See application file for complete search history.

(56) References Cited

U.S. PATENT DOCUMENTS

| 7,116,476 B2 * | 10/2006 | Suzuki et al. | ............... 359/457 |
| 7,525,728 B2 * | 4/2009 | Ogawa et al. | ............... 359/457 |
| 7,535,637 B2 * | 5/2009 | Ogawa et al. | ............... 359/457 |
| 2005/0099687 A1 | 5/2005 | Watanabe | |
| 2008/0013171 A1 * | 1/2008 | Kumagai et al. | ............ 359/457 |

FOREIGN PATENT DOCUMENTS

| JP | 62-019837 | 1/1987 |
| JP | 2002-221611 A | 8/2002 |
| JP | 2003-114481 | 4/2003 |
| JP | 2004-70188 A | 3/2004 |
| JP | 2004-77535 A | 3/2004 |
| WO | WO2005/059641 | 6/2005 |

* cited by examiner

*Primary Examiner*—Christopher Mahoney
(74) *Attorney, Agent, or Firm*—Birch, Stewart, Kolasch and Birch, LLP

(57) ABSTRACT

The Fresnel lens sheet according to the present invention has a plurality of prismatic Fresnel lens elements including a Fresnel facet, a riser facet, and a top facet crossing the facet and the riser facet on an entrance surface. An angle of the top facet of each Fresnel lens element constituting the lens relative to the an exit surface, $\delta 1$, is determined so that an exit angle of the light that has entered each of the top facets and exits from the exit surface, $\beta$, is greater than 35 degrees.

7 Claims, 12 Drawing Sheets

FIG.9

| lens element refractive index: 1.55, basic layer refractive index: 1.53, lens element apex angle: $\alpha$ :42°, lens pitch 51P: 100 $\mu$ m ||
|---|---|
| Fresnel lens entrance angle: $\theta$ | Fresnel angle: $\gamma$ |
| 50° | 59.8° |
| 65° | 54.1° |
| 80° | 48.3° |

FIG.13

| lens element refractive index: 1.55, basic layer refractive index: 1.53, lens element apex angle: $\alpha$ :42°, lens pitch 51P:100 $\mu$ m, flat portion length $x$ of top facet of lens element: 3 $\mu$ m ||||| |
|---|---|---|---|---|
| Fresnel lens entrance angle | Fresnel angle | top facet angle || unwanted light exit angle | unwanted light intensity |
| $\theta$ | $\gamma$ | $\delta 1$ | $\delta 2$ | $\beta$ | |
| 50° | 59.8° | 0° | 120.2° | 50° | 1.00° |
| | | 10° | 110.2° | 43° | 1.08° |
| | | 20° | 100.2° | 35° | 1.17° |
| | | 30° | 90.2° | 28° | 1.25° |
| | | 40° | 80.2° | 22° | 1.33° |
| | | 50° | 70.2° | 16° | 1.42° |
| 65° | 54.1° | 0° | 125.9° | 65° | 1.04° |
| | | 10° | 115.9° | 51° | 1.29° |
| | | 20° | 105.9° | 40° | 1.50° |
| | | 30° | 95.9° | 32° | 1.71° |
| | | 40° | 85.9° | 25° | 1.88° |
| | | 50° | 75.9° | 19° | 2.08° |
| 80° | 48.3° | 0° | 131.7° | 80° | 1.00° |
| | | 10° | 121.7° | 66° | 1.71° |
| | | 20° | 111.7° | 50° | 2.25° |
| | | 30° | 101.7° | 39° | 2.67° |
| | | 40° | 91.7° | 30° | 2.96° |
| | | 50° | 81.7° | 23° | 3.17° |

FRESNEL LENS SHEET, LIGHT-TRANSMISSION SCREEN, AND PROJECTION IMAGE DISPLAY APPARATUS

FIELD OF THE INVENTION

The present invention relates to Fresnel lens sheets, light-transmission screens using the Fresnel lens sheet, and projection image display apparatuses incorporating the light-transmission screen.

BACKGROUND OF THE INVENTION

A Fresnel lens sheet for use in a light-transmission screen employed for a conventional projection image display apparatus, which includes a plurality of prismatic Fresnel lens elements each having a riser facet and a Fresnel facet on a first surface of the lens, is configured so that a light projected from an optical projection unit passes through the riser facet of each Fresnel lens element, and then totally internally reflects by the Fresnel facet, to exit from a second surface of the lens. In such a Fresnel lens sheet, in order to efficiently reflect by the Fresnel facet a light that has entered the riser facet, it is preferable that an angle formed by the riser facet and the Fresnel facet be set to an acute angle of 45 degrees or less. However, a problem has been that when the Fresnel lens element is formed by setting the angle to the acute angle, breakage of the elements is prone to occur when handling them during transport, assembly or the like, thus leading to reduction in yield of the lens.

For that reason, a Fresnel lens sheet has been proposed that includes a plurality of prismatic Fresnel lens elements each having a top facet crossing between a riser facet and a Fresnel facet (for instance, Japanese Unexamined Patent Publication 2002-221611 (refer to paragraph 0020; FIG. 6)).

However, another problem has been that in situations where a top facet is formed so as to cross between the riser facet and Fresnel facet of the Fresnel lens element, a light beam that has passed through the top facet becomes an unwanted light that exits in a direction differing from the original exit direction, which turns out to be a double image, thereby leading to reduction of the image quality.

SUMMARY OF THE INVENTION

The present invention is directed to the problems as set forth above, and an object thereof is to provide a Fresnel lens element, a light-transmission screen using the lens element, and a projection image display apparatus incorporating the screen, that suppresses reduction of the image quality owing to the unwanted light resulting from the Fresnel lens sheet, to enable a high quality image to be displayed.

The Fresnel lens sheet according to the present embodiment has a plurality of prismatic Fresnel lens elements including a Fresnel facet, a riser facet, and a top facet crossing the facet and the riser facet on an entrance surface. An angle of the top facet of each Fresnel lens element constituting the lens relative to the an exit surface, $\delta_1$, is determined so that an exit angle of the light that has entered each of the top facets and exits from the exit surface, $\beta$, is greater than 35 degrees.

A light-transmission screen according to the present invention displays on the front surface thereof an image of light projected from the rear side thereof. The light-transmission screen comprises a Fresnel lens sheet disposed on the rear side and a lenticular lens array disposed on the front of the screen, which spreads an exit light beam from the Fresnel lens sheet. The Fresnel lens sheet has a plurality of prismatic Fresnel lens elements on an entrance surface disposed at the rear side, which cause a light beam that has entered the entrance surface to exit from the exit surface at a predetermined exit angle. Each of the prismatic Fresnel lens elements includes a riser facet and a Fresnel surface. Each of the Fresnel elements has a top facet crossing between the riser facet and the Fresnel facet. The angle of the top facet of each Fresnel lens element constituting the lens relative to the an exit surface, $\delta_1$, is determined so that the exit angle of the light that has entered each top facet and exits from the exit surface, $\beta$, is greater than a viewing angle of the screen, $\epsilon$, defined by the Fresnel lens sheet and an the lenticular lens array.

Because the angle relative to the exit surface of each top facet is defined so that the exit angle formed when light that has entered the top facets exits from the exit surface is greater than 35 degrees, the use of the Fresnel lens sheet of the present invention makes it hard to view the unwanted light that has exited via the top facet, thus enabling favorable images to be displayed. These and other features, advantages and objects of the present invention will be further understood and appreciated by those skilled in the art by reference to the following drawings.

BRIEF DESCRIPTION OF THE DRAWINGS

FIG. 9 is a view showing a relationship between an entrance angle and a Fresnel angle in the Fresnel lens sheet;

FIG. 13 is a table showing a simulation result of unwanted light exit angles and unwanted light intensity in the Fresnel lens sheet having the top facets;

DETAILED DESCRIPTION OF THE PREFERRED EMBODIMENTS

Embodiment 1

Figure 1:
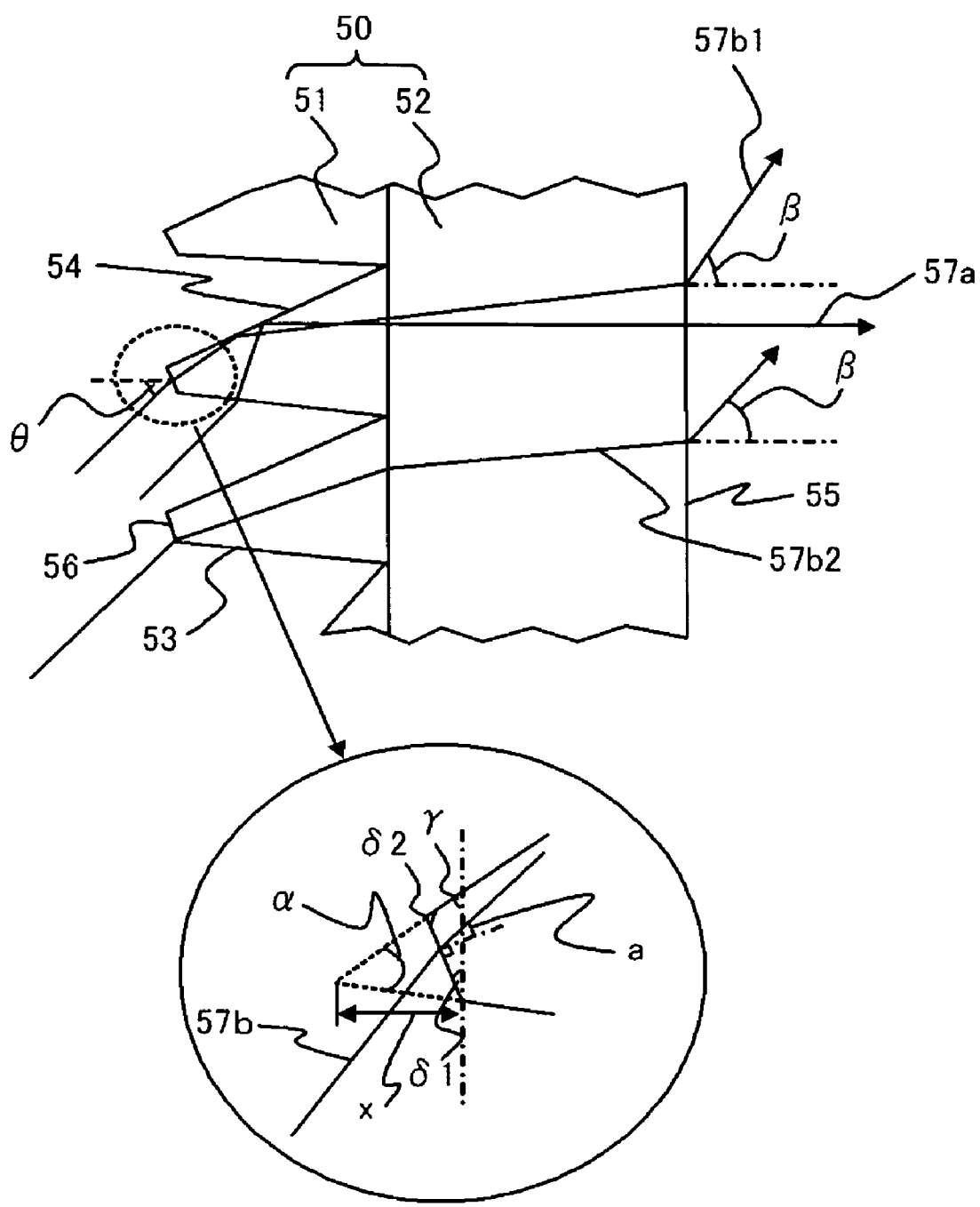
FIG. 1 is a cross-sectional view showing a configuration of a Fresnel lens sheet according to Embodiment 1 of the present invention.
Figure 2:
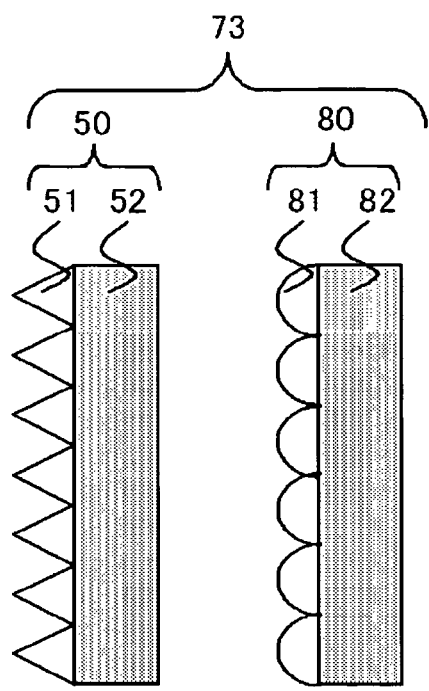
FIG. 2 is a cross-sectional view showing a configuration of a light-transmission screen according to Embodiment 1 of the present invention.
Figure 3:
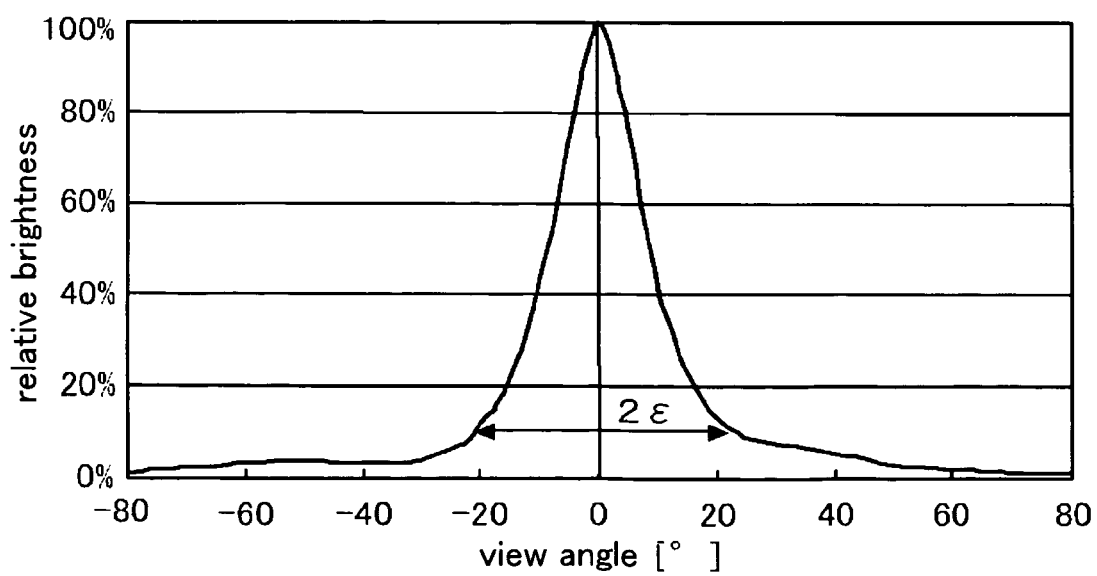
FIG. 3 is a view showing a vertical field of view characteristic of the light-transmission screen according to Embodiment 1 of the present invention.
Figure 4:
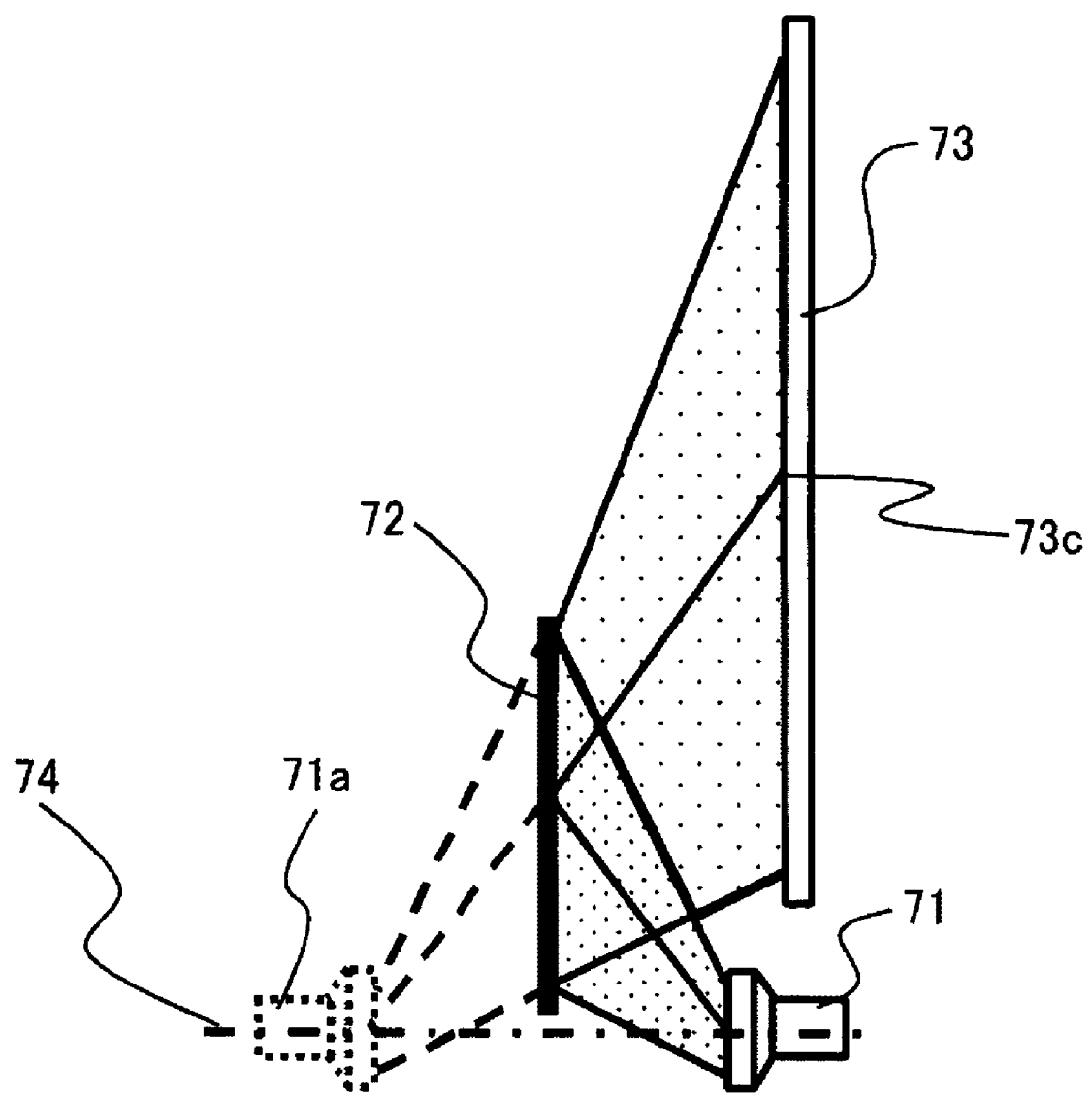
FIG. 4 is a view showing an optical configuration of a projection image; display apparatus according to Embodiment 1 of the present invention.

FIGS. 1 to 4 show a Fresnel lens sheet, a light-transmission screen, and a projection image display apparatus according to Embodiment 1 of the present invention. FIG. 1 is a fragmentary cross-sectional view showing a configuration of the Fresnel lens sheet. FIG. 2 is a fragmentary cross-sectional view showing a configuration of the light-transmission screen having the Fresnel lens sheet. FIG. 3 is a view showing the field-of-view characteristic of the light-transmission screen. FIG. 4 is a view showing a configuration of an optical system in the projection image display apparatus.

As shown in FIG. 1, a Fresnel lens sheet 50 is configured by a Fresnel lens portion 51, including a plurality of Fresnel lens elements for changing the direction of a light projected from the optical projection unit (or light source side) to a desired direction, and a base layer 52. Each of the Fresnel lens elements constituting the Fresnel lens portion 51 includes a riser facet 53 where the light from the optical projection unit enters, a Fresnel facet 54 that totally internally reflects in a direction at a desired angle the light having passed through the riser facet 53, and a top facet 56 formed so as to cross between the riser facet 53 and the Fresnel facet 54.

Further, as shown in FIG. 2, a light-transmission screen 73 is configured by two lenses, the Fresnel lens sheet 50 and a lenticular lens array 80. The Fresnel lens sheet 50 functions to bend in a direction at a desired angle an incident light beam from the optical projection unit. On the other hand, as well as spreading at a lens portion 81 a light that has exited from the Fresnel lens sheet 50, the lenticular lens array 80 further spread the light by imparting diffusion characteristics to a base layer 82. Note that the base layer 52 of the Fresnel lens sheet 50 also has a diffusion function, and the diffusion characteristic of the light-transmission screen 73, i.e., the field of view characteristic is determined by the performance obtained by combining those of the Fresnel lens sheet 50 and the lenticular lens array 80.

FIG. 3 shows the field of view characteristic in the vertical direction of the light-transmission screen 73 according to the above configuration. The horizontal axis denotes an angle of viewing the screen 73 (the observation angle), and the vertical axis, brightness, which shows relative brightness against brightness of viewing the screen 73 from the right front (the observation angle=0 degrees). When the field of view characteristic of the screen 73 is to be evaluated, an angle in which the brightness becomes 1/10 of the peak brightness is often represented as the viewing angle. In a case of the field-of-view characteristic as shown in FIG. 3, the angle in which the brightness becomes 1/10 or more of the peak one, is ±22, with the viewing angle ε being represented as 22 degrees. In general, the viewing angle in the vertical direction often falls within a range in the order of 20 through 35 degrees. Viewing at an angle greater than this range results in sharp reduction in brightness. Thus, viewing angles greater than this range are unsuitable for watching TV.

Further, FIG. 4 shows a projection image display apparatus having a projection lens system 71 that projects the image of light, a reflection mirror 72 that reflects the image of light projected from the projection lens system 71, and the light-transmission screen 73 that displays to the front side thereof an image of light entering via a reflection mirror 72 from the rear side thereof. The projection image display apparatus also have an electric circuit such as image signal processor that generates image signals (not shown). Note that in the projection image display apparatus shown in FIG. 4, those optical elements located closer to the light source than the projection lens system is omitted.

Here, a general configuration and operation of the Fresnel lens sheet and the like according to Embodiment 1 of the present invention will be described prior to describing in greater detail.

Figure 5:
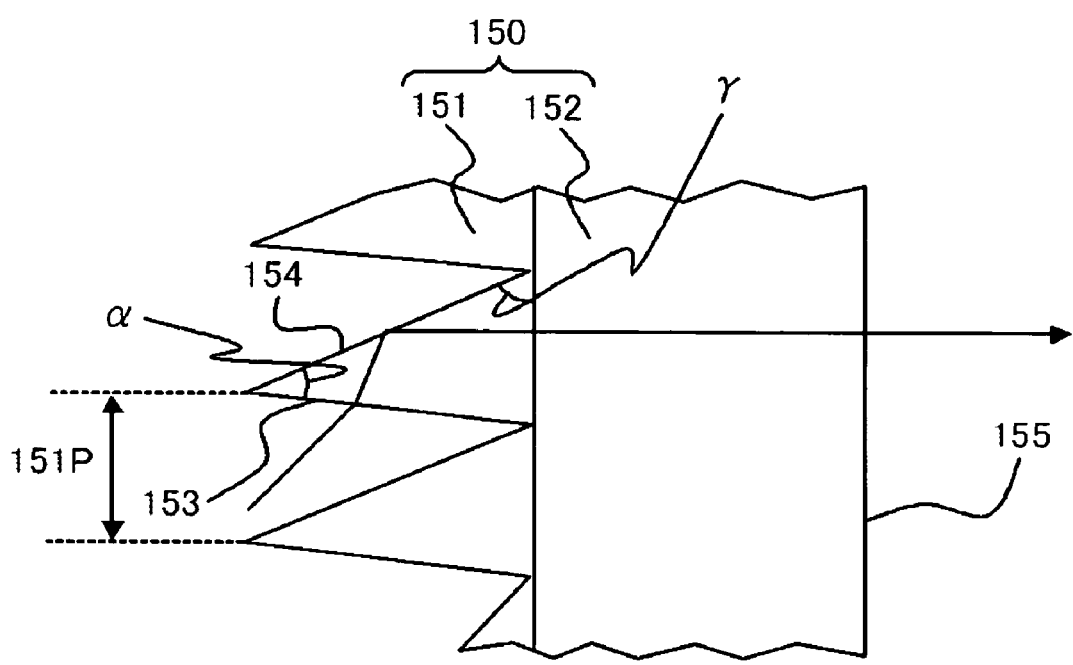
FIG. 5 is a cross-sectional view showing a configuration of a typical total internal reflection Fresnel lens sheet.

The Fresnel lens sheet incorporated into the light-transmission screen broadly includes two kinds of Fresnel lens sheets: one is a total internal reflection type of which Fresnel lens portion is disposed at the entrance side or the light source side), the Fresnel lens sheet according to Embodiment 1; and the other is a refractive type of which the lens portion is disposed at the light exit side or the viewer side. A typical total internal reflection (TIR) Fresnel lens sheet 150 is configured as shown in FIG. 5. Incident light beams from the light source pass through a riser facet 153 of a Fresnel lens element, to enter each Fresnel lens element, and totally internally reflect at a Fresnel facet 154 in a direction at a desired angle, to exit from an exit surface 155 of a base layer 152 toward the viewer side. Here, the shapes of (or the apex angle formed by) the riser facet 153 and the Fresnel facet 154 in each Fresnel lens element are determined corresponding to an entrance angle (which differs depending on incident surfaces) of the incident light beams at the Fresnel lens sheet 150.

Figure 6:
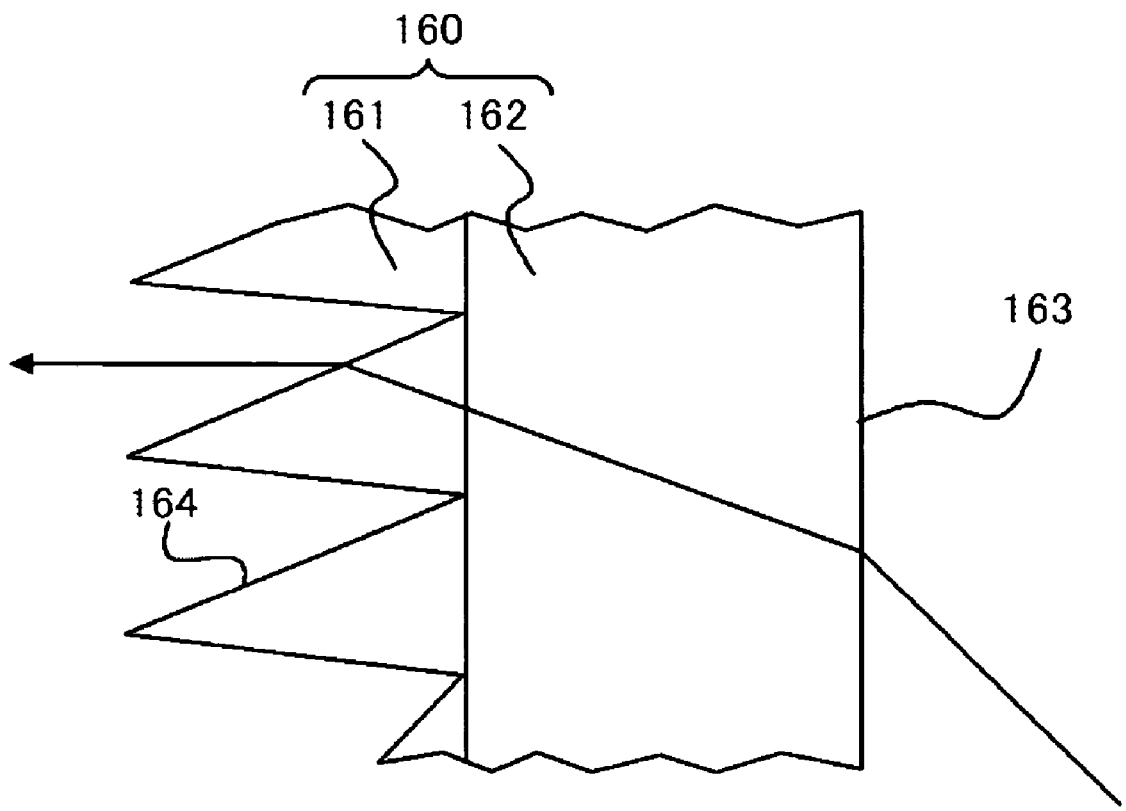
FIG. 6 is a cross-sectional view showing a configuration of a typical refractive Fresnel lens sheet.

On the other hand, a typical refractive Fresnel lens sheet 160 is configured as shown in FIG. 6, and the incident light beam from the light source (the right side in the figure) enters a base layer 162 from an incident surface 163, and then exits by being reflected in a direction at a desired angle at a Fresnel facet 164 of each of Fresnel lens elements 161. In the refractive Fresnel lens 160 as well, the shapes (angle) of the Fresnel lens portion 161 are determined corresponding to an entrance angle of the incident light beam.

Figure 7:
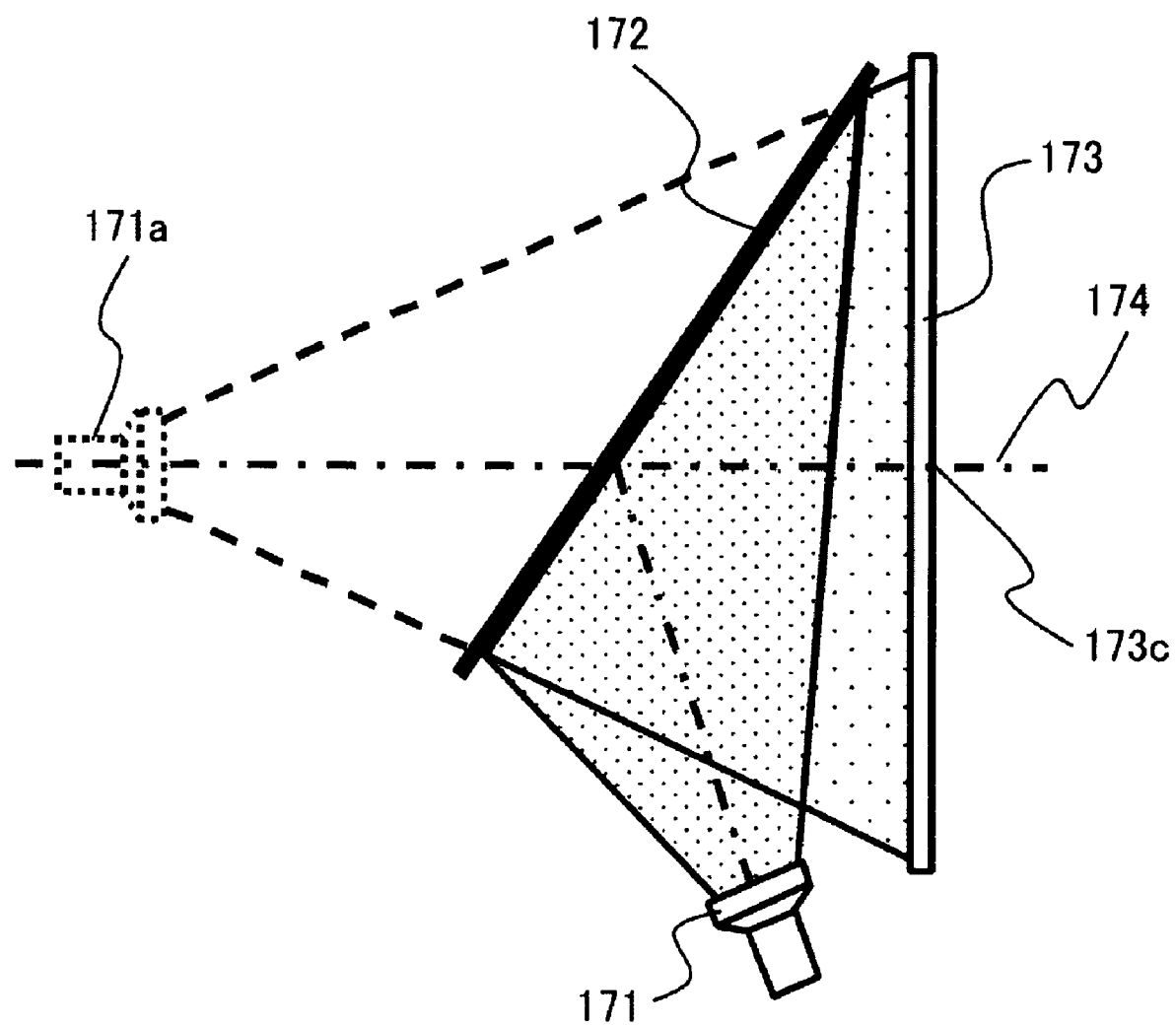
FIG. 7 is a view showing an optical configuration of a typical upward projection image display apparatus.

Next, a configuration view of a typical projection image display apparatus (television) that projects an image using the light-transmission screen will be described referring to FIG. 4, a view illustrating Embodiment 1 and FIG. 7. In FIG. 7 is shown a so-called vertical projection, which is configured so that an optical axis 174 in a projection lens system 171 coincides with the center 173c of a light-transmission screen 173. The projection lens system 171 is disposed at the location of a projection lens 171a, relative to the light-transmission screen 173, which, if disposed at this location, results in a configuration of the television having a very large depth. For this reason, generally, a light from the projection lens system 171 is reflected toward the screen 173 using an obliquely arranged rear mirror 172.

In a case of an upward projection television as shown in FIG. 7, the entrance angle to the screen 173 of a light entering the center 173c of the screen 173 becomes zero degrees. The entrance angle to the screen 173 concentrically becomes larger as the light approaches the peripherals of the screen 173. To make smaller the depth dimension of this upward projection television, the projection lens 171 needs to be designed to be positioned closer to the screen 173, and because interference of the projection lens system 171 with a projected light needs to be avoided, there is a practical limitation on realization of thin screen TVs.

On the other hand, in the projection image display apparatus in Embodiment 1 is employed a so-called oblique projection as shown in FIG. 4, in which the optical axis 74 of the projection lens system 71 and the center 73*c* of the screen 73 do not coincide. Because this is one in which light of images is obliquely projected onto a screen, the distance between the projection lens 71 and the screen 73 can be made comparatively short. In general, the entrance angle of the light to the screen 73 is made larger than that of the upward projection as shown in FIG. 7. Moreover, making smaller the depth dimension of oblique projection televisions can be achieved by making larger the entrance angle of the light to the screen 73.

Here, the oblique projection in Embodiment 1 (FIG. 4) has a rear mirror 72 arranged parallel to the screen 73, but the invention is not limited to this one. For instance, the rear mirror 72 may obliquely be disposed, or may be mounted on a ceiling plane, to reflect by an upper side, or the light may be projected directly to the screen 73 without using the rear mirror 72.

Figure 8:
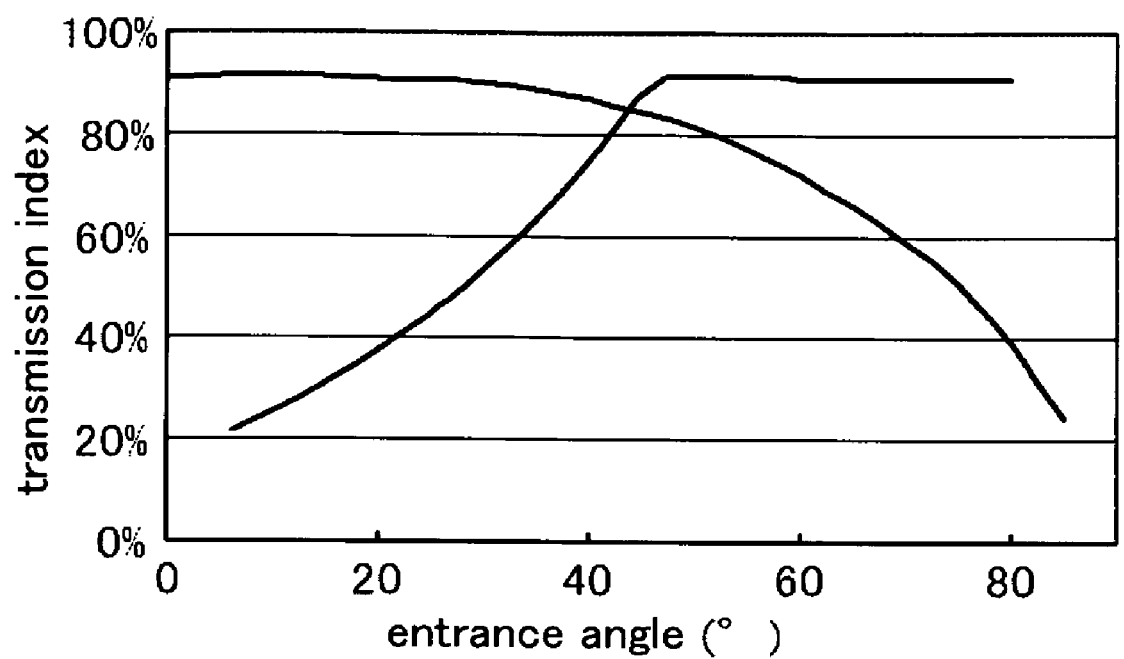
FIG. 8 is a view showing a relationship between an entrance angle and a transmission index performance in a typical total internal reflection Fresnel lens and a refractive Fresnel lens.

Next, features of two kinds of the Fresnel lens sheets will be described in conjunction with the above-described projection. FIG. 8 shows transmission indexes of light beams corresponding to the entrance angle of the total internal reflection (TIR) Fresnel lens sheet 150 and the refractive Fresnel lens sheet 160. In the TIR Fresnel lens sheet 150, although the transmission index of the light beam is low in a region where the entrance angle is small, the transmission index increases as the entrance angle becomes larger. When the entrance angle becomes greater than 45 degrees, a light-transmission index of 90 percent or more can be achieved. In contrast, for the refraction Fresnel lens sheet 160, the transmission index of the light is 90 percent or more, which is excellent, in a region where the entrance angle is small. However, the index decreases progressively as the angle becomes larger. In the refractive Fresnel lens sheet 160, when the entrance angle to the light-transmission screen 73 exceeds 35 degrees, the index becomes 90 percent or less.

Whether the TIR Fresnel lens sheet 150 or refractive Fresnel lens sheet 160 is selected depends on specifications for the depth dimension of television, projection lens design or cost requirement. However, to make the depth dimension of television smaller, i.e., reduction in thickness, the oblique projection is to be selected as shown in the projection image display apparatus (FIG. 4) of Embodiment 1. For the oblique projection, the entrance angle of the light to the screen 73 becomes larger. Thus, the use of the TIR Fresnel lens 150 facilitates further reduction in thickness of the apparatus.

The lens sheet 150 is designed to be configured as shown schematically in FIG. 5. An angle α formed by the riser facet 153 and the Fresnel facet 154 (apex angle) in the lens portion 151 of the lens sheet 150 is determined by an angle of the cutting tool edge of a mold for manufacturing the lenses. In a case of the lens sheet 150, an apex angle α of the lens element 151 is often made to be 45 degrees or less for improvement of the transmission index.

Discussions will be made with regard to shapes of the Fresnel lens sheet 150, in which a refractive index of a material of the lens portion 151 in the TIR Fresnel lens sheet 150 is assumed to be 1.55, a refractive index of the base layer 152 is assumed to be 1.53, an apex angle α of the lens element is assumed to be 42 degrees, and a lens pitch 151P of the lens portion 151 is assumed to be 100 micro-meters. In this instance, an angle formed by the Fresnel facet 154 of the lens element and the exit surface 155 is identified as γ (hereinafter called Fresnel angle). FIG. 9 shows the Fresnel angle γ of each lens element under condition that a direction of the light beam from the lens sheet 150 via each lens element is parallel (perpendicular to the exit surface 155), wherein the entrance angles θ (defined according to a position in the surface of the TIR Fresnel lens sheet 150) of the light beam to the typical Fresnel lens element in the lens sheet 150 under such conditions are identified as 50, 65 and 80 degrees.

Figure 10:
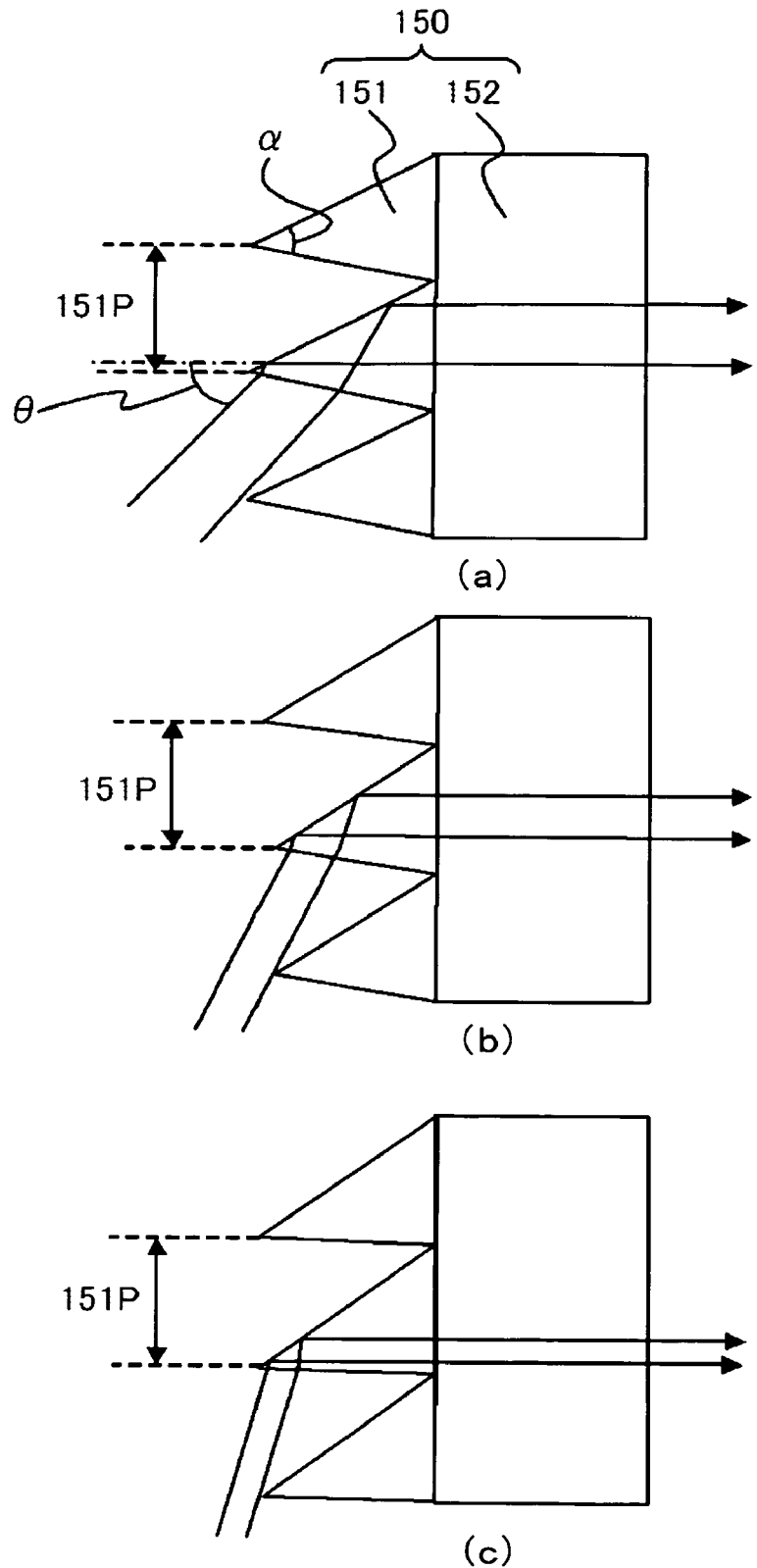
FIG. 10 shows cross-sectional views of configurations of Fresnel lens elements in which entrance angles of light beams differ from each other in a typical total internal reflection Fresnel lens sheet.

FIG. 10 shows shapes of each Fresnel lens element, and conceptual examples of the light beams passing through each element, in situations where the entrance angle θ of the light beam to the typical Fresnel lens element in the TIR Fresnel lens sheet 150 is set to 50, 65, and 80 degrees. FIG. 10(*a*) is a conceptual example of the light beam entering the TIR Fresnel lens sheet 150 with an entrance angle of 50 degrees, FIG. 10(*b*) is another example with an entrance angle of 65 degrees, and FIG. 10(*c*) is still another example with an entrance angle of 80 degrees. The figures show that when the Fresnel lens is configured with the same lens pitch 151P, a light beam transmission region with respect to each Fresnel lens element in the lens portion 151 becomes narrower as the entrance angle becomes larger. In other words, the density of transmitted light beam in the upper end portion of the lens element becomes higher as the entrance angle becomes larger.

As shown in FIG. 10, if the apex angle α of the lens element is made sharp, then an ideal transmission index of the TIR Fresnel lens can be achieved as shown in FIG. 8. That is, even when the entrance angle to each lens element in the lens sheet 150 is any of 50, 65 and 80 degrees, favorable performance having a transmission index of 90 percent or more can be achieved.

However, as shown in FIG. 10, in order to form in a sharp-edge shape the tip of the lens elements 151, a cutting tool edge of a mold for manufacturing the lens sheet 150 also needs to be sharp-edged. Forming in a sharp-edge shape the cutting tool edge of the mold increases the possibility of a problem such as breakage of the edge occurring during manufacture. Furthermore, when the tips of the lens elements of the lens 150 is sharp-edged, and the surface of the lens 150 is rubbed or hit against something during transport or installation, there is a possible problem with breakages of the tips of the lens elements or the like. The breakages of the tips of the lens elements in the lens 150 lead to reduction of the light beam transmission index and reduction of light efficiency, or cause the occurrence of unwanted light that is likely to degrade the image quality.

Figure 11:
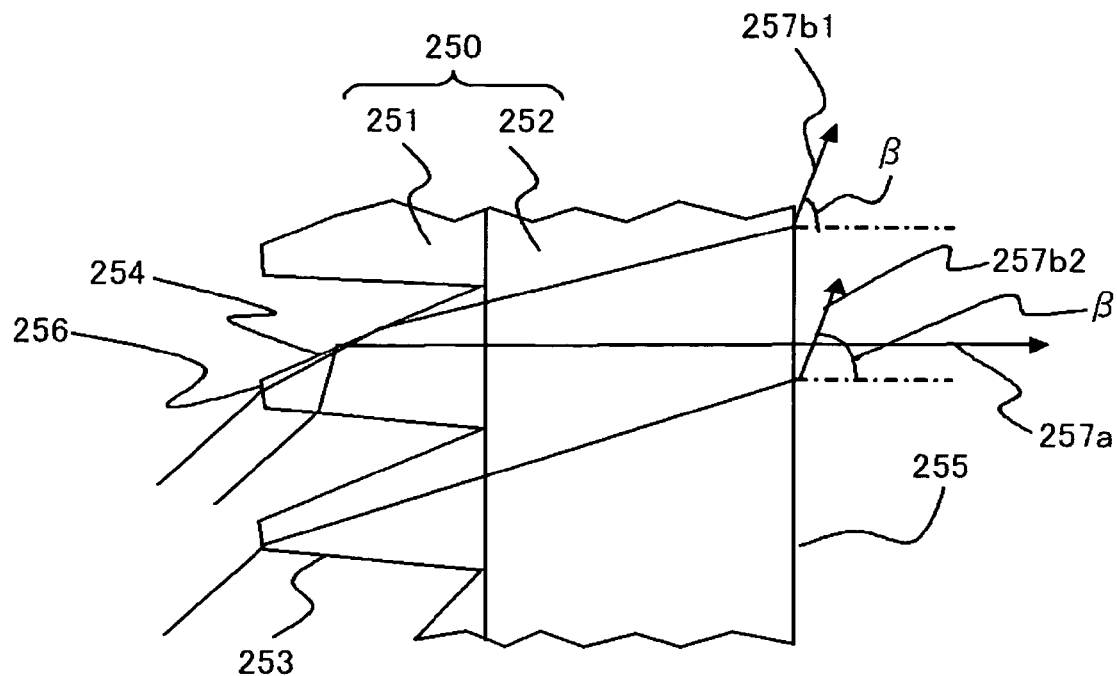
FIG. 11 is a cross-sectional view illustrating an operation in the conventional Fresnel lens sheet having top facets.

According to aforementioned Japanese Unexamined Patent Publication 2002-221611, in order to circumvent such a problem, as shown in FIG. 11, each Fresnel lens element that constitutes a lens portion 251 of a Fresnel lens sheet 250 is configured to have a flat top facet 256 crossing between a riser facet 253 and a Fresnel facet 254. However, the fact that the top facet 256 is merely formed as shown in Japanese Unexamined Patent Publication 2002-221611 causes the following problems to arise.

The light beam 257*a* that has passed through the riser facet 253 of the lens element to reflect totally internally by the Fresnel facet 254 is made to exit from the exit surface 255 to the viewer side at a desired angle (for FIG. 1, zero degree exit angle) as with Embodiment 1 (like the light beam 57*a* in FIG. 1). On the other hand, the light beam 257*b*1 that has entered the top facet 256 of each Fresnel lens element of the lens portion 251 totally internally reflects by the Fresnel facet 254, and exits from the exit surface 255. Or, the light beam 257*b*2 that has entered the top facet 256 directly exits from the exit surface 255. The light beams 257*b*1, 257*b*2 (hereinafter both represented as 257*b*) exits in a direction differing from the original exit direction (i.e., the exit direction of the light beam 257*a* in FIG. 11). When the light beam 257*a* that exits in the original exit direction is defined as normal light, the light beam 257*b* that exits in an exit direction differing therefrom becomes unwanted light.

Figure 12:
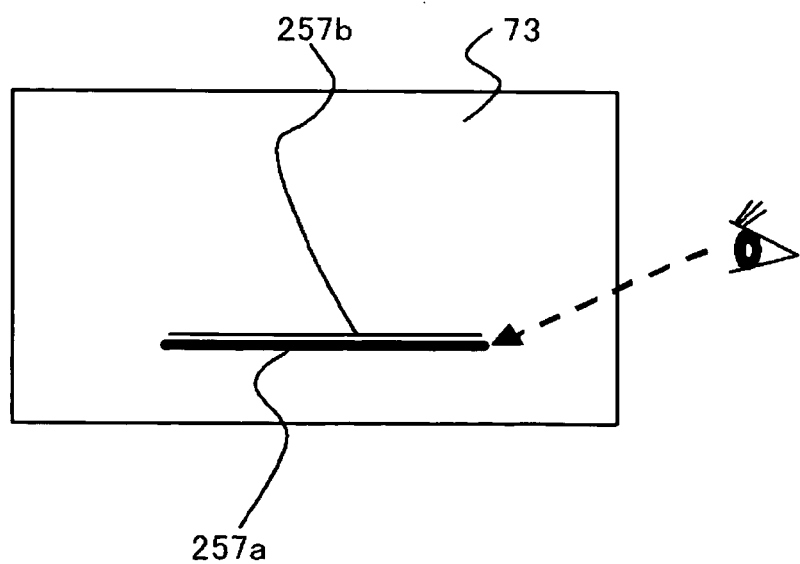
FIG. 12 is a view showing a double image resulted from unwanted light in the conventional Fresnel lens sheet having the top facets.

For instance, when a single horizontal line is displayed on the screen, the unwanted light 257b is a light beam that exits in a direction differing from that of the normal light 257a. Referring to FIG. 12, when looking down at the light-transmission screen 73, the unwanted light 257b is viewed above the normal light 257a (or below depending on a configuration, or in a direction normal to Fresnel lens elements of the lens 250), whereby the image quality results in some degradation. This is what is generally called double image, which results in a defect of the apparatus such that a single line is observed as a double image when looking down at the screen.

If the tip of each Fresnel lens element in the lens portion 151 is configured to be sharp-edged as shown in FIG. 5, then such unwanted light is not produced. However, when consideration is given to manufacturing, it is preferable that the tip of each Fresnel lens element of the lens portion 151 not be much sharp-edged.

On the contrary, as has been described above the light-transmission screen has the viewing angle $\epsilon$ determined depending on a specific combination of the Fresnel lens sheet and the lenticular lens array. Thus, in watching television, when a view angle becomes greater than the viewing angle $\epsilon$, the brightness sharply decreases, resulting in practical difficulty in viewing the image. Namely, if the unwanted light 257b that has entered the top facet 256 exits at an angle larger than the viewing angle $\epsilon$ of the light-transmission screen 73, then the unwanted light is hard to visually perceive from the usual position of watching the television, thus achieving favorable images.

Here, relationships between the exit angle $\beta$ of the unwanted light 57b and the top facet 56 of each Fresnel lens element in the lens portion 51 of the Fresnel lens sheet 50 according to Embodiment 1 will be described referring to FIG. 1. The entrance angle of the light beam to the lens portion 51 of the Fresnel lens sheet 50 is represented as $\theta$, an angle formed by the top facet 56 and the exit surface 55 of the lens sheet 50, the top facet angle, is represented as $\delta 1$, an angle formed between the Fresnel facet 54 and the exit surface 55 of the lens sheet 50, the Fresnel angle, is represented as $\gamma$, the refractive index of a material of the lens portion 51 is represented as n1, and the refractive index of a material of the base layer 52 is represented as n2, then the entrance angle of the light beam to the top facet 56 is $\theta - \delta 1$. The light beam having passed through top facet 56 enter the lens portion 51 at a reflection angle a. The reflection angle a is calculated using Equation 1 derived from so called Snell's law:

$$a = \mathrm{SIN}^{-1}(\mathrm{SIN}(\theta - \delta 1)/n1) \quad (1)$$

The light beam having passed through the top facet 56 is separated into two patterns according to the angle: one is the unwanted light 57b1 that is totally internally reflected by the Fresnel facet 54 after passing through the surface 56 and then exits from the lens; the other is the unwanted light 57b2 exits from the lens without passing through the Fresnel facet 54. Whether or not all the light beams reflect by the Fresnel facet 54 after passing through the top facet 56, depends on the top facet angle $\delta 1$ and the entrance angle $\theta$ of the light beam.

The exit angle $\beta$ of the unwanted light 57b1 that is totally internally reflected by the Fresnel facet 54 after passing through the top facet 56 and exits from the exit surface 55 can be calculated by the following Equation 2:

$$\beta = \arcsin(n1 * \sin(180 - (\delta 1 + a + 2\gamma))) \quad (2)$$

On the other hand, the exit angle $\beta$ of the unwanted light 57b2 that exits from the exit surface 55 without being reflected by the Fresnel facet 54 can be calculated by the following Equation 3:

$$\beta = \arcsin(n1 * \sin(a + \delta 1)) \quad (3)$$

Conditions will be discussed for causing the unwanted light 57b1, 57b2 to exit at the exit angle $\beta$ larger than the viewing angle $\epsilon$ of the light-transmission screen 73. Since each exit angle $\beta$ of the unwanted light 57b1, 57b2 is calculated by Equation 2 and Equation 3, the condition that the exit angle $\beta$ becomes larger than the viewing angle $\epsilon$ of the screen 73 is given by Equation 4, in a situation where the unwanted light beam is totally internally reflected by the Fresnel facet 54 after passing through the top facet 56.

$$\beta = \arcsin(n1 * \sin(180 - (\delta 1 + a + 2\gamma))) > \epsilon \quad (4)$$

Namely, when the viewing angle of the light-transmission screen 73 incorporating the Fresnel lens sheet 50 is $\epsilon$, in order not to allow the unwanted light 57b1 to be visually perceived, the top facet angle $\delta 1$ of each Fresnel lens element is defined so that the condition shown in Equation 5 is satisfied.

Here, the maximum value of the viewing angle in the typical light-transmission screen is 35 degrees. Thus, if the angle $\beta$ is made larger than 35 degrees, that is, if the top facet angle $\delta 1$ of each Fresnel lens element is given so that the condition shown by Equation 6 is satisfied, then the Fresnel lens sheet 50 can be achieved in which the unwanted light 57b1 is visually perceived in most of the light-transmission screen $$\arcsin(n1 * \sin(180 - (\delta 1 + a + 2\gamma))) > 35 \quad (6)$$

On the other hand, when the unwanted light 57b2 that, after passing through the top facet 56, is not totally internally reflected by the Fresnel facet 54, a condition that the exit angle $\beta$ is larger than the viewing angle $\epsilon$ of the screen 73, is given by Equation 7.

$$\beta = \arcsin(n1 * \sin(a + \delta 1)) > \epsilon \quad (7)$$

That is, when the viewing angle of the light-transmission screen 73 incorporating the Fresnel lens sheet 50 is $\epsilon$, in order not to allow the unwanted light 57b2 to be visually perceived, the top facet angle $\delta 1$ of each Fresnel lens element is given so that the condition shown in Equation 8 is satisfied.

Here, as is the case with the unwanted light 57b1, if the angle $\beta$ is made larger than 35 degrees, that is, if the top facet angle $\delta 1$ of each Fresnel lens element is given so that the condition shown by Equation 9 is satisfied, then the Fresnel lens sheet 50 can be achieved in which the unwanted light 57b1 is visually perceived in most of the light-transmission screen.

$$\arcsin(n1 * \sin(a + \delta 1)) > 35 \quad (9)$$

Using Equation 2 and Equation 3 described above, relationships among the top facet angle $\delta 1$, intensities of the unwanted light 57b1, 57b2 (hereinafter both numerals represented as 57b), the exit angle $\beta$ of the unwanted light 57b, and the top facet angle $\delta 2$ relative to the Fresnel facet 54 of the top facet 56 of each Fresnel lens element in the lens portion 51, have been actually studied by means of simulation.

Figure 14:
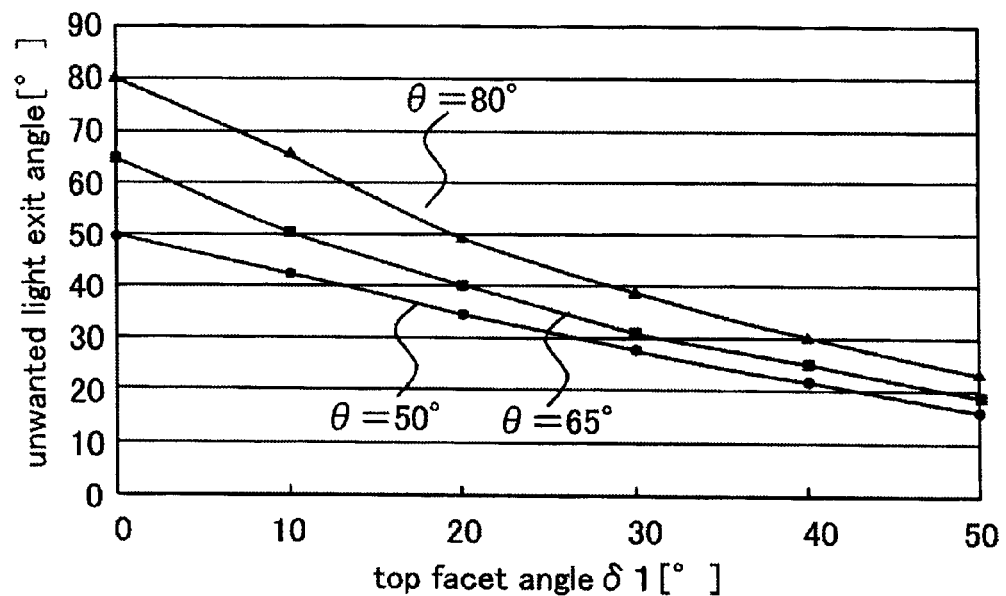
FIG. 14 is a graph showing relationships between the top facet angles and the unwanted light exit angles in the Fresnel lens sheet having the top facets, based on the simulation results.
Figure 15:
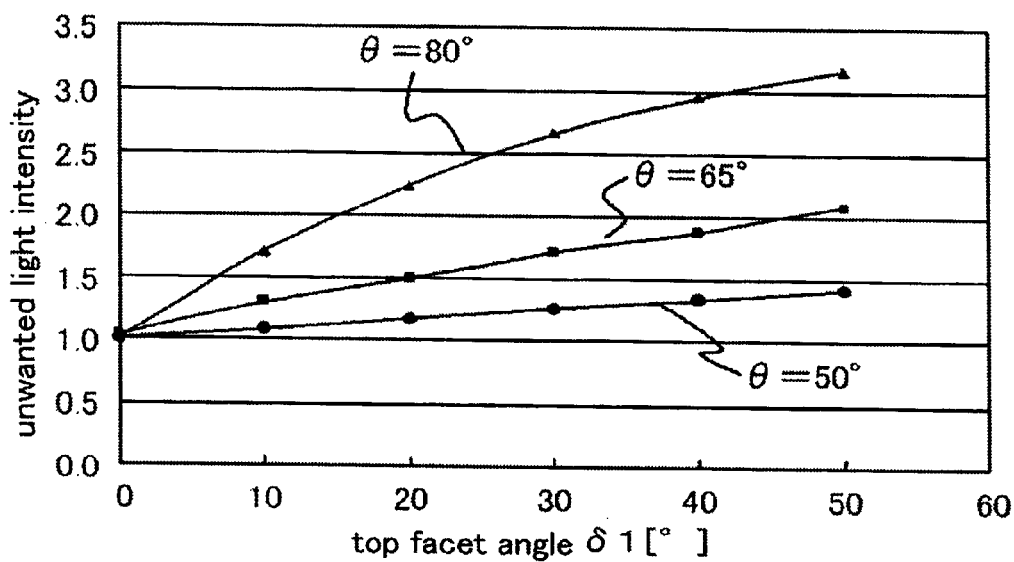
FIG. 15 is another graph showing relationships between the top facet angles and the unwanted light exit angles in the Fresnel lens sheet having the top facets, based on the simulation results.

The simulation at this time has been conducted, as shown in FIG. 9, by assuming that the refractive index of the material of the lens portion 51 is 1.55, refractive index of the base layer 52 is 1.53, the apex angle $\alpha$ of the lens element (an angle formed by the intersection of two imaginary planes as shown in dashed lines in the enlarged portion of FIG. 1 extended from the Fresnel facet 54 and the riser facet 53) is 42 degrees, and the lens pitch 51P of the Fresnel lens portion 51 is 100 μm. Under such conditions, the entrance angles $\theta$ of the light beam to the typical Fresnel lens element of the Fresnel lens sheet 50 are assumed to be 50, 65, and 80 degrees. The Fresnel angle in situation where the light beam from the lens sheet 50 is made to be exited in parallel is represented as γ. The flat portion length x of the top facet 56 of each lens element 51 (a horizontal distance from the intersection between the Fresnel facet 54 and the riser facet 53 to the intersection between the top facet 56 and the riser facet 53) is assumed to be 3 μm. FIG. 13 shows simulation results of exit angles β, and intensities of the unwanted light 57b when the top facet angle δ1 is varied. FIG. 14 shows a relationship between the output angle β of unwanted light 57b and the top facet angle δ1. FIG. 15 shows a relationship between the intensity of the unwanted light 57b and the top facet angle δ1.

As is apparent from FIGS. 13 and 14, when the top facet angle δ1 varies from zero degrees (at this moment, the top facet 56 is in parallel with the exit surface 55 of the lens 50) to 50 degrees, the value of the exit angle β of the unwanted light 57b becomes smaller accordingly. The fact that the unwanted light exit angle becomes small shows that the unwanted light is easy to visually perceive from the front position of usually watching television. In other words, when the value P of the exit angle of the unwanted light 57b becomes larger, the unwanted light 57b is harder to visually perceive from the location of usually watching television. It can be said that the larger the output angle of the unwanted light 57b, the more favorable the visibility.

Further, in this consideration, the flat portion length x of the top facet 56 of the Fresnel lens sheet 50 is assumed to be constant 3 μm. As described in FIG. 8, the larger the entrance angle θ of the Fresnel lens sheet 50 becomes, the higher the density of the light beam that falls on the top facet of each lens element in lens portion 51 becomes. Thus, it is seen from FIGS. 13 and 15 that when the length of the top facet 56 is assumed to be constant, the larger the entrance angle θ becomes, the larger the intensity of the unwanted light 57b passing through the top facet 56 becomes. Note that the unwanted light intensities shown in FIGS. 13 and 15 are indicated as relative values against the intensity of the unwanted light 57b in a situation where an entrance angle θ of the light beam is 50 degrees and the top facet angle δ1 at the top facet 56 of the lens elements of the Fresnel lens sheet 50 is zero degrees.

Further, FIG. 13 shows the angle δ2 formed by the top facet 56 and the Fresnel facet 54. In any situation, the value of δ2 is made larger than the top facet angel of 42 degrees in an original lens element (in situations where the lens element is not formed with the top facet 56). This means that each lens element is shaped to have a blunt edge, which leads to enhancement of the manufacturing of the Fresnel lens sheet 50 and also can avoid the problem such as the tip of lens element being chipped or broken during handling the lens sheet 50.

Moreover, the exit angle β of the unwanted light 57b can be make greater by reducing the angle δ1 of the top facet 56 of each Fresnel element as close to zero degrees as possible, and further the unwanted light intensity can be reduced to a small amount for an light beam entering at a greater angle of entrance.

In this way, in Embodiment 1, the exit angle β of the unwanted light 57b is made larger than the viewing angle ε of the screen 73 so that the unwanted light is hard to view from the position of watching the conventional television, whereby the unwanted light 57b is not visually perceived, thus resulting in favorable images being achieved.

The Fresnel lens sheet 50 in Embodiment 1 has a plurality of prismatic Fresnel lens elements each including a Fresnel facet 54, a riser facet 53 and a top facet 56 connecting the facet 54 with the riser facet 53 on an entrance surface thereof, as shown in FIG. 4. An angle of the top facet 56 of each Fresnel lens element constituting the lens relative to the an exit surface 55, δ1, is determined so that an exit angle of the light 57b that has entered each of the top facets 56 and exits from the exit surface 55, β, is greater than 35 degrees. The Fresnel lens sheet 50 having this structure prevents the unwanted light 57b from being visually perceived, and enables favorable image to be displayed when it is incorporated into the typical light-transmission screen.

In particular, by configuring the lens so that the angle δ1 is made to be 20 degrees or less, the output angle β of the unwanted light 57b can be made to be more than 35 degrees when the lens is incorporated into the above-described projection image display apparatus in which the image of light has an entrance angle of 50 degrees or more, even if defining δ1 constantly. For that reason, since a cut edge angle of a cutting tool for use of manufacturing the Fresnel lens sheet 50 can be blunt and shaped to vary uniformly, the manufacture process time of the mold can be reduced, and the problem such that the tip of lens element is likely to be broken can also be avoided. When the lens is incorporated into most of the general light-transmission screens, favorable images can be displayed without visually perceiving the unwanted light.

The light-transmission screen 73 according to Embodiment 1 displays on the front surface thereof an image of light projected from the rear side thereof as shown in FIG. 4. The light-transmission screen 73 comprises a Fresnel lens sheet disposed on the rear side and a lenticular lens array 80 disposed on the front of the screen, which spreads an exit light beam from the Fresnel lens sheet 50 as shown in FIG. 2. The Fresnel lens sheet 50 has a plurality of prismatic Fresnel lens elements on an entrance surface disposed at the rear side, which cause a light beam that has entered the entrance surface to exit from the exit surface at a predetermined exit angle. Each of the prismatic Fresnel lens elements includes a riser facet 53 and a Fresnel surface 54. Each of the Fresnel elements has a top facet 56 crossing between the riser facet 53 and the Fresnel facet 54. The angle of the top facet 56 of each Fresnel lens element constituting the lens relative to the an exit surface 55, δ1, is determined so that the exit angle of the light 57b that has entered each top facet and exits from the exit surface 55, β, is greater than a viewing angle of the screen, ε, defined by the Fresnel lens sheet and an the lenticular lens array. Thus, favorable images can be displayed without visually perceiving the unwanted light.

In particular, the top facets 56 is configured so as to satisfy arcsin(n1*sin(180−(δ1+a+2γ)))>ε when each light entering the Fresnel lens element exits from the exit surface after having been reflected by each Fresnel facet, and arcsin(n1*sin(a+δ1))>ε when each entering the Fresnel lens element exits from the exit surface without being reflected by each Fresnel facet, where θ is an entrance angle of a light entering each of the Fresnel lens element, γ is an angle of each Fresnel facet of each Fresnel lens element relative to the exit surface, and a is an reflection angle of light that has entered each of the top facets. Thus, without visually perceiving the unwanted light, favorable images are allowed to be displayed.

Furthermore, the projection image display apparatus according to Embodiment 1 comprises a light-transmission screen 73, an optical projection unit (including a projection lens system 71 and a mirror 72), and an image signal processor, whereby the unwanted light 57b that has entered the top facet 56 is difficult to visually perceive, thus enabling favorable images to be displayed. Here, the light-transmission screen 73 includes the Fresnel lens sheet 50 in which the angle δ1 of the top facet 56 is defined so that the exit angle β the above-described unwanted light 57b is larger than the predetermined value. The optical projection unit projects an image of light beam from the rear of the light-transmission screen. The image signal processor generates an image signal for producing the an image of light beam in an optical projection unit, to output the generated image signal to the optical projection unit.

Here, in Embodiment 1, an example in which the lens portion 81 of the lenticular lens array 80 is provided at the incident side has been described. The same field of view characteristic holds for a configuration where the lens portion 81 is provided at the exit side. Further, in FIG. 2, an example in which two components, the Fresnel lens 50 and the lenticular lens array 80 constitute the screen 73. However, a configuration which realize a function of both two components by single component. When configuring by a single component is used, the angle $\delta 1$ of the top facet 56 may be defined by an angle relative to exit surface of the single component.

Further, a consideration at this time has been carried out by assuming the length of the flat portion x to be 3 µm. Since the amount of the unwanted light increases as the length becomes long, an unused light can be decreased by making the flat portion x shorter. It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A Fresnel lens sheet, comprising:
  a plurality of prismatic Fresnel lens elements on an entrance surface of the lens sheet, each of the prismatic Fresnel lens elements including a Fresnel facet, a riser facet, and a top facet crossing between the Fresnel facet and the riser facet, wherein $\delta 1$ is an angle formed by each top facet of each Fresnel lens element constituting the lens relative to the exit surface of the lens, and $\beta$ is an exit angle of a light that has entered on each top facet-relative to the exit surface, wherein the angle $\delta 1$ is determined so that the angle $\beta$ is greater than 35 degrees.

2. A Fresnel lens sheet, comprising:
  a plurality of prismatic Fresnel lens elements on an entrance surface of the lens, including a Fresnel facet, a riser facet, and a top facet crossing between the Fresnel facet and the riser facet, wherein $\delta 1$ is an angle formed by each top facet of each Fresnel lens element constituting the lens relative to the exit surface, wherein the top facet is formed so that the angle $\delta 1$ is smaller than 20 degrees.

3. A light-transmission screen, comprising:
  the Fresnel lens sheet of either of claim 1 or claim 2; and
  a lenticular lens array disposed on the exit side of the Fresnel lens, spreading a light beam that has exited from the Fresnel lens.

4. A projection image display apparatus, comprising:
  A light-transmission screen including:
    the Fresnel lens sheet of either of claim 1 or claim 2, and
    a lenticular lens array disposed on the exit side of the Fresnel lens, spreading a light beam that has exited from the Fresnel lens;
  an optical projection unit that projects an image of light beam to the light-transmission screen from the rear side thereof; and
  an image signal processor that generates an image signal for producing the image of light beam in the optical projection unit, to output the generated image signal to the projection unit.

5. A light-transmission screen for displaying on a front side thereof an image of light projected from a rear side thereof, the light-transmission screen comprising:
  a Fresnel lens sheet disposed on the rear side, having on an entrance surface of the rear side a plurality of prismatic Fresnel lens elements that includes a Fresnel facet and a riser facet, the Fresnel lens sheet causing a light beam entering from the entrance surface thereof to exit from an exit surface at a predetermined angle; and
  a lenticular lens array disposed on the front side of the screen, spreading an exit light beam from the Fresnel lens sheet,
  wherein each of the Fresnel lens elements having a top facet crossing between the Fresnel facet and the riser facet, and wherein $\beta$ is an exit angle of a light that has entered each top facet and exits from the exit surface, $\epsilon$ is a viewing angle of the screen defined by the Fresnel lens sheet and the lenticular lens array and $\delta 1$ is an angle formed by each top facet of each Fresnel lens element relative to the exit surface, wherein $\delta 1$ is determined so that the angle $\beta$ is greater than $\epsilon$.

6. The light-transmission screen of claim 5, wherein $\theta$ is an entrance angle of each of light beams entering each of the Fresnel lens element, $\gamma$ is an angle of each Fresnel facet of each Fresnel lens element relative to the exit surface, $\alpha$ is an reflection angle of each a light that has entered each of the top facets, and $n1$ is a refractive index of a material of Fresnel lens element, wherein the top facet is formed so as to satisfy arcsin $(n1*\sin(180-(\delta 1+\alpha+2\gamma)))>\epsilon$ when each light entering the Fresnel lens element exits from the exit surface after having been reflected by each Fresnel facet, and arcsin $(n1*\sin(\alpha+\delta 1))>\epsilon$ when each light entering the Fresnel lens element exits from the exit surface without being reflected by each Fresnel facet.

7. A projection image display apparatus, comprising:
  a light-transmission screen of any one of claims 5 and 6;
  an optical projection unit that projects an image of light beam to the light-transmission screen from the rear side thereof; and
  an image signal processor that generates an image signal for producing the image of light beam in the optical projection unit, to output the generated image signal to the optical projection unit.

* * * * *